United States Patent
Haseyama

(10) Patent No.: US 10,663,741 B2
(45) Date of Patent: May 26, 2020

(54) BEAM INTENSITY CONVERSION OPTICAL SYSTEM AND BEAM INTENSITY CONVERSION LENS

(71) Applicant: PANASONIC INTELLECTUAL PROPERTY MANAGEMENT CO., LTD., Osaka (JP)

(72) Inventor: Ryo Haseyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 20 days.

(21) Appl. No.: 15/777,759

(22) PCT Filed: Oct. 7, 2016

(86) PCT No.: PCT/JP2016/004515
§ 371 (c)(1),
(2) Date: May 21, 2018

(87) PCT Pub. No.: WO2017/110022
PCT Pub. Date: Jun. 29, 2017

(65) Prior Publication Data
US 2018/0335637 A1 Nov. 22, 2018

(30) Foreign Application Priority Data
Dec. 22, 2015 (JP) .................................. 2015-250144

(51) Int. Cl.
*G02B 27/09* (2006.01)
*G02B 13/18* (2006.01)

(52) U.S. Cl.
CPC ......... *G02B 27/0927* (2013.01); *G02B 13/18* (2013.01); *G02B 27/0955* (2013.01)

(58) Field of Classification Search
CPC .... G02B 27/0927; G02B 27/09; G02B 13/18; G02B 13/00; G02B 27/44; G02B 27/0955;
(Continued)

(56) References Cited

U.S. PATENT DOCUMENTS

2010/0110547 A1    5/2010   Ando et al.

FOREIGN PATENT DOCUMENTS

| JP | 2003-255262 A | 9/2003 |
| JP | 2004-233814 A | 8/2004 |

(Continued)

OTHER PUBLICATIONS

International Search Report and Written Opinion issued in International Patent Application No. PCT/JP2016/004515, dated Dec. 13, 2016; with partial English translation.

*Primary Examiner* — Jie Lei
(74) *Attorney, Agent, or Firm* — McDermott Will & Emery LLP

(57) ABSTRACT

Beam intensity conversion optical system of the present disclosure includes a laser light source and a beam intensity conversion lens that changes the light intensity distribution of laser light emitted from the laser light source and irradiates the light onto an irradiation region. The beam intensity conversion lens has a single-lens structure. The position of a paraxial image plane of the beam intensity conversion lens and the position of and the position of irradiation region are different from each other on an optical axis. The beam intensity conversion lens has a longitudinal spherical aberration characteristic on the paraxial image plane in which a changing range of longitudinal spherical aberration in a region of more than 70% of an image height is equal to or smaller than 20% of the amount of longitudinal spherical aberration at a position of 70% of the image height.

8 Claims, 10 Drawing Sheets

(58) Field of Classification Search
CPC ........ G02B 17/08; G02B 7/1324; G02B 5/18;
G02B 3/04; G02B 21/084; G02B 3/00
USPC ....... 359/719, 718, 796, 800, 647, 565, 569,
359/566; 372/29.014
See application file for complete search history.

(56) References Cited

FOREIGN PATENT DOCUMENTS

| | | |
|---|---|---|
| JP | 2013-130835 A | 7/2013 |
| WO | 2008/090838 A1 | 7/2008 |

US 10,663,741 B2

BEAM INTENSITY CONVERSION OPTICAL SYSTEM AND BEAM INTENSITY CONVERSION LENS

CROSS-REFERENCE OF RELATED APPLICATIONS

This application is a U.S. national stage application of the PCT International Application No. PCT/JP2016/004515 filed on Oct. 7, 2016, which claims the benefit of foreign priority of Japanese patent application No. 2015-250144 filed on Dec. 22, 2015, the contents all of which are incorporated herein by reference.

TECHNICAL FIELD

The present disclosure relates to a beam intensity conversion optical system and a beam intensity conversion lens for changing light intensity distribution of laser light emitted from a laser light source and radiating the laser light onto an irradiation region.

BACKGROUND ART

The light intensity distribution of laser light output from a laser light source has a Gaussian form. A beam intensity conversion optical system which converts the light intensity distribution of laser light from the Gaussian form into to a flat-top form has been in consideration. According to the beam intensity distribution with a flat-top form of the present disclosure, the changing range of the light intensity distribution in a desired region of laser light is equal to or smaller than 10% of a peak intensity.

A laser excitation light source is an example that uses a beam intensity conversion optical system. The laser excitation light source applies the laser light emitted from the beam intensity conversion optical system onto a phosphor to excite white light. The beam intensity conversion optical system converts the light intensity distribution of laser light emitted from the laser light source from the Gaussian form into a flat-top form, and then applies the laser light to a phosphor. That is, the laser light applied to the phosphor has light intensity distribution with a flat-top form so as to suppress convergence of light intensity onto the phosphor.

A conventional beam intensity conversion optical system includes a collimator lens, a lens array, and an objective lens disposed in this order in a direction from the laser light source toward the phosphor. The collimator lens converts diverging light emitted from the laser light source into collimated light. The lens array converts the light intensity distribution of the laser light from the Gaussian form into a flat-top form. The condenser lens applies the laser light passed through the lens array onto an irradiation region of the phosphor.

PTL 1 is known as prior-art technique relating to the present disclosure.

CITATION LIST

Patent Literature

PTL 1: Japanese Patent Laid-Open Publication No. 2003-255262.

SUMMARY

A beam intensity conversion optical system according to an aspect of the present disclosure includes a laser light source and a beam intensity conversion lens. The beam intensity conversion lens has a single-lens structure. The position of a paraxial image plane of the beam intensity conversion lens and the position of an irradiation region are different from each other on an optical axis of laser light.

According to another aspect of the beam intensity conversion lens of the present disclosure, the beam intensity conversion lens has a longitudinal spherical aberration characteristic on the paraxial image plane in which the changing range of longitudinal spherical aberration in a region of more than 70% of an image height is equal to or smaller than 20% of the amount of longitudinal spherical aberration at a position of 70% of the image height.

This beam intensity conversion optical system and the beam intensity conversion lens are composed of a small number of parts.

DETAILED DESCRIPTION OF PREFERRED EMBODIMENTS

The aforementioned beam intensity conversion optical system requires at least a lens array, a collimator lens, and a condenser lens disposed opposite to the laser light source, which increases the number of components of the beam intensity optical system. As a result, in the assembling process of the beam intensity conversion optical system, the optical-axis adjustment of each lens structure with reference to the laser light source becomes a time-consuming work. Besides, it has difficulty in downsizing of the beam intensity conversion optical system.

An exemplary embodiment of the present disclosure will be described below with reference to accompanying drawings. The exemplary embodiment below is a preferable example of the present disclosure, and therefore, it is to be understood that values, shapes, materials, components, a layout of components, and a connection configuration of the components shown in the descriptions below are mere an example and they are not to be construed as limitation on the technical scope of the present disclosure. Therefore, of the components described in the exemplary embodiment below, a component that has no description in an independent claim showing the most significant concept of the present invention will be described as any component.

Figure 1:
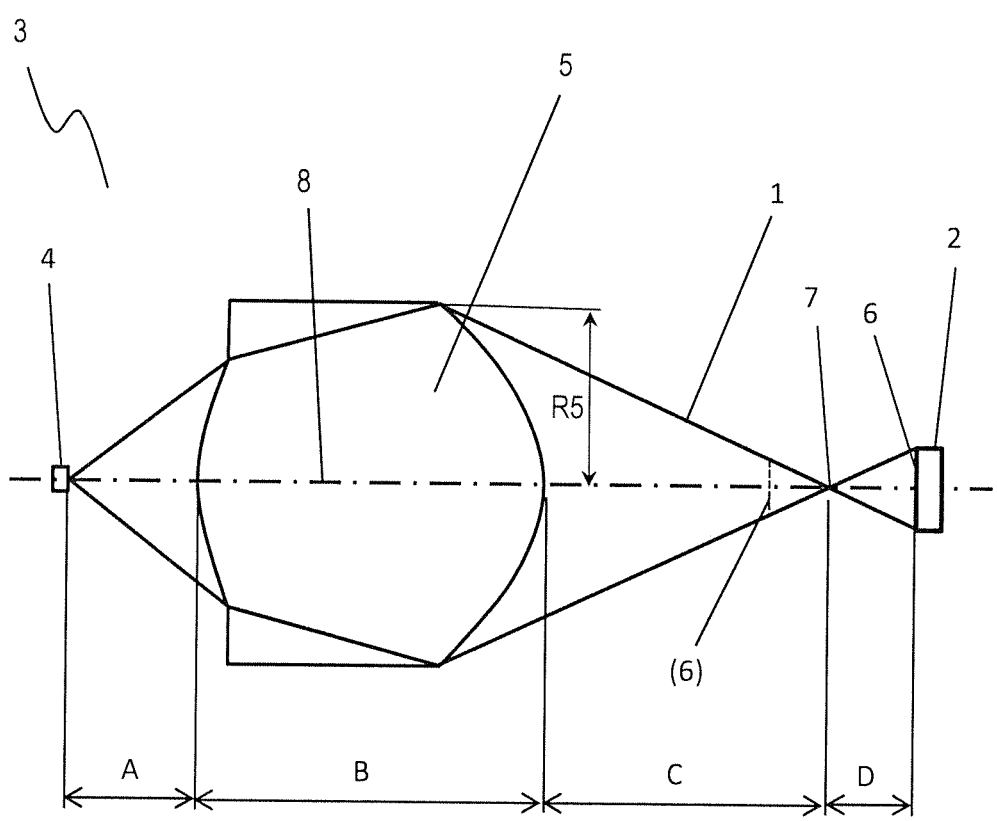
FIG. 1 schematically shows a laser excitation light source including a beam intensity conversion optical system in accordance with an exemplary embodiment of the present disclosure.

FIG. 1 shows a laser excitation light source that allows phosphor 2 to excite white light by irradiation of laser light 1 onto phosphor 2. The laser excitation light source includes beam intensity conversion optical system 3 and phosphor 2. Beam intensity conversion optical system 3 includes laser light source 4 and beam intensity conversion lens 5. Laser light source 4 is implemented by a laser diode. Beam intensity conversion lens 5 has a function to convert a diverging light emitted from laser light source 4 into collimated light, a function to convert a light intensity distribution of laser light 1 from a Gaussian form into a flat-top form, and a function to apply laser light 1 with a light intensity distribution changed to the flat-top form onto phosphor 2 of irradiation region 6. In the aforementioned flat-top light intensity distribution, a changing range of the light intensity distribution of laser light 1 within a predetermined region is equal to or smaller than 10% of the peak intensity.

Beam intensity conversion lens 5 of beam intensity conversion optical system 3 is a single lens having a single-lens structure. Beam intensity conversion optical system 3 has a structure where the position of paraxial image plane 7 of beam intensity conversion lens 5 and the position of irradiation region 6 are different from each other on optical axis 8 of laser light 1.

In the case that beam intensity conversion lens 5 with a single lens is used, a magnification ratio with respect to incident light may be determined to allow beam intensity conversion lens 5 to function as a collimator lens and a condenser lens. Besides, in terms of the longitudinal spherical aberration characteristic of beam intensity conversion lens 5 with a single lens, the position of paraxial image plane 7 different from the position of irradiation region 6 allows the light intensity distribution of laser light to be controlled.

In a light collection optical system, such as a condenser lens, irradiation region 6 is generally determined to be identical to the position of paraxial image plane 7 on optical axis 8. In this case, however, laser light 1 has high degree of condensation at the position of paraxial image plane 7, accordingly preventing uniform distribution of light intensity of laser light 1. In contrast, irradiation region 6 apart from the position of paraxial image plane 7 allows laser light to have a uniform distribution of light intensity. For example, as shown in FIG. 1, irradiation region 6 is located posterior to the position of paraxial image plane 7. In this configuration, laser light 1 which has condensed to paraxial image plane 7 is dispersed before reaching irradiation region 6. That is, in irradiation region 6, laser light 1 has a decreased peak value of light intensity distribution, thereby easily providing a uniform distribution of light intensity of laser light 1. When irradiation region 6 is located anterior to the position of paraxial image plane 7, as denoted by the broken line shown in FIG. 1, laser light 1 is insufficiently condensed in irradiation region 6. In that case, laser light 1 has a decreased peak value of light intensity distribution in irradiation region 6, thus easily providing a uniform distribution of light intensity of laser light 1.

Figure 2:
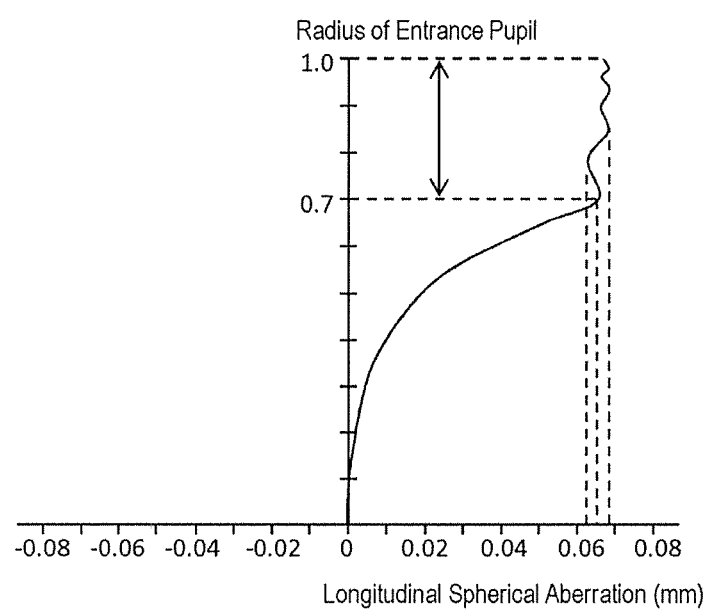
FIG. 2 shows a longitudinal spherical aberration characteristic of the beam intensity conversion lens of the beam intensity conversion optical system in accordance with the embodiment of the present disclosure.

FIG. 2 shows a longitudinal spherical aberration characteristic of beam intensity conversion lens 5. The vertical axis of FIG. 2 represents a value obtained by normalizing an entrance pupil radius R5 of beam intensity conversion lens 5. The scale of "0" on the vertical axis indicates the center of the lens through which optical axis 8 of laser light 1 passes, and the scale of "1.0" indicates a position of the effective diameter of the lens. The horizontal axis of FIG. 2 represents the amount of the longitudinal spherical aberration of beam intensity conversion lens 5.

The changing range of longitudinal spherical aberration in a region of more than 70% of the image height of beam intensity conversion lens 5 may be equal to or smaller than 20% of the amount of longitudinal spherical aberration at a position of 70% of the image height. The region of more than 70% of the image height corresponds to the range between the scale of "0.7" and the scale of "1.0" on the vertical axis of FIG. 2. In optical design, the region of more than 70% of the image height in the longitudinal spherical aberration characteristic generally has an increased amount of longitudinal spherical aberration. That is, the region corresponds to a range that forms the foot area of the light intensity distribution of a Gaussian form. However, in optical design of beam intensity conversion lens 5, the light intensity distribution of laser light 1 can be corrected by controlling the longitudinal spherical aberration characteristic in the region of more than 70% of the image height, i.e., in the region forming the foot area of the Gaussian distribution. That is, the light intensity distribution of laser light 1 is converted from the Gaussian form into a flat-top form.

In beam intensity conversion lens 5, the transition of the longitudinal spherical aberration characteristic between optical axis 8 and the position at the position of 70% of the image height may be determined to gradually change. The gradual change means a gradual increase or a gradual decrease. The transition of the amount of longitudinal spherical aberration between the center of the lens and the position at the position of 70% of the image height has no sign inversion.

Next, examples and comparative examples of beam intensity conversion optical system 3 including beam intensity conversion lens 5 will be described below. Laser light 1 suppl(i)ed? from laser light source 4 of beam intensity conversion optical system 3 has a wavelength of 450 nm. The desired region of a flat-top form in laser light 1 is the range with a radius of 0.15 mm about optical axis 8. The distance between laser light source 4 and beam intensity conversion lens 5 is defined as "A"; the thickness of beam intensity conversion lens 5 is defined as "B"; the distance between beam intensity conversion lens 5 and paraxial image plane 7 is defined as "C"; and the distance between paraxial image plane 7 and irradiation region 6 is defined as "D". Beam intensity conversion lens 5 has a single-lens structure having an aspherical shape. The glass material of beam intensity conversion lens 5 has refractive index "n" of 1.65 at a wavelength of 450 nm. The aspherical shape of beam intensity conversion lens 5 is expressed as the following formula.

$$X = \frac{C_j h^2}{1 + \sqrt{1 - (1 + k_j)C_j^2 h^2}} + \sum A_{j,n} h^n \quad \text{[Formula 1]}$$

where:

"X" represents the distance from the tangent plane of the aspherical vertex of a point on the aspherical surface with height 'h' from the optical axis;

"h" represents the height from the optical axis;

"$C_j$" represents the curvature factor of the aspherical vertex in the j-th surface of the objective lens ($C_j = 1/R_j$);

"$k_j$" represents the conic constant in the j-th surface of the objective lens; and "$A_{j,n}$" represents the n-th aspherical coefficient in the j-th surface of the objective lens.

EXAMPLE 1

Example 1 is beam intensity conversion optical system 3 shown in FIG. 1 with a structure where irradiation region 6 is located posterior to paraxial image plane 7. Table 1 shows design data of beam intensity conversion lens 5 of example 1.

TABLE 1

| | | Example 1 |
|---|---|---|
| Apodization type | | Gaussian |
| Apodization factor | | 1 |
| Object-side NA | | 0.60 |
| Object distance | A | 0.929 |
| Lens thickness | B | 2.500 |
| Paraxial image plane position | C | 1.993 |
| Flat-top position | D | 0.800 |
| Lens surface parameter on object side | R | 0.820060 |
| | C | −4.239845 |
| | A4 | 0.013174 |
| | A6 | −0.000965 |
| | A8 | 0.000802 |
| | A10 | 0.003885 |
| Lens surface parameter on image side | R | −0.928438 |
| | C | −2.103832 |
| | A4 | −0.027152 |
| | A6 | 0.040076 |
| | A8 | −0.034561 |
| | A10 | 0.015252 |

Figure 3:
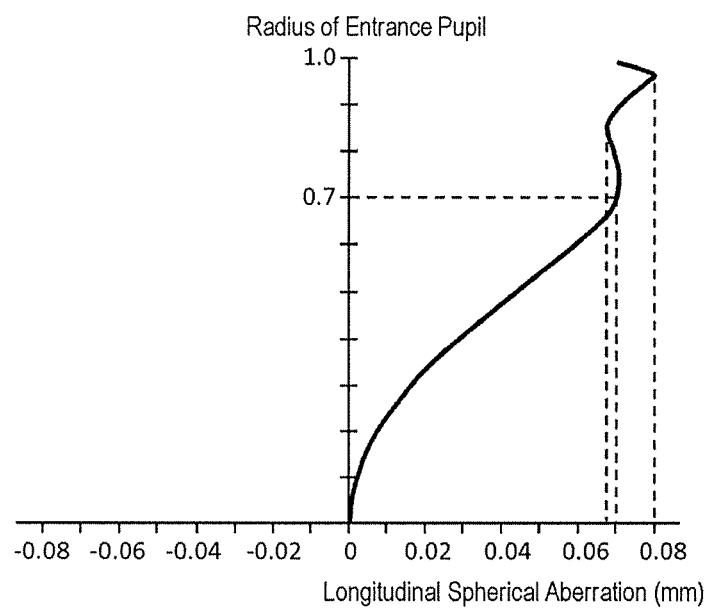
FIG. 3 shows a longitudinal spherical aberration characteristic of the beam intensity conversion lens of example 1 corresponding to the embodiment of the present disclosure.
Figure 4:
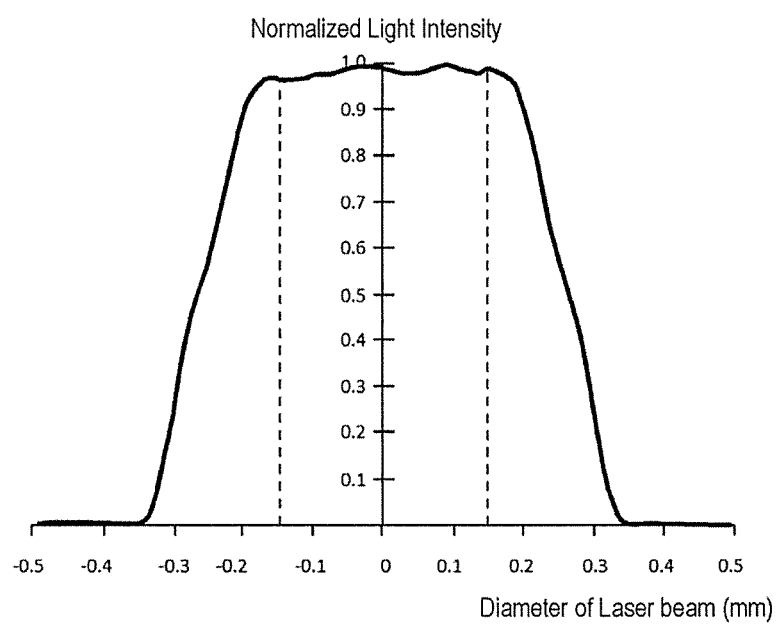
FIG. 4 shows a light intensity distribution in the irradiation region of the beam intensity conversion optical system of example 1 corresponding to the embodiment of the present disclosure.

FIG. 3 shows the longitudinal spherical aberration characteristic on paraxial image plane 7 of beam intensity conversion lens 5 of example 1. FIG. 4 shows the light intensity distribution in irradiation region 6 of beam intensity conversion optical system 3 of example 1. In FIG. 4, the vertical axis represents light intensity, showing values normalized at a peak value of 1.0. The horizontal axis represents the diameter of laser light 1.

As shown in FIG. 3, the longitudinal spherical aberration of beam intensity conversion lens 5 gradually increases in the range from optical axis 8 to the position of 70% of the image height. The amount of the longitudinal spherical aberration on paraxial image plane 7 at the position 70% of the image height is +0.07 mm. The minimum value of the amount of the longitudinal spherical aberration on paraxial image plane 7 in a region of more than 70% of the image height is +0.068 mm, whereas the maximum value of the amount of the longitudinal spherical aberration on paraxial image plane 7 in a region of more than 70% of the image height is +0.08 mm. The changing range of the longitudinal spherical aberration in the region of more than 70% of the image height is thus 0.012 mm. That is, in beam intensity conversion lens 5, the changing range of the longitudinal spherical aberration in the region of more than 70% of the image height is equal to or smaller than 20% of the amount of the longitudinal spherical aberration at the position of 70% of the image height.

According to the light intensity distribution characteristic of laser light 1 applied to irradiation region 6 from beam intensity conversion lens 5, as shown in FIG. 4, the light intensity distribution in a desired region has a minimum value of 0.965. That is, beam intensity conversion optical system 3 employing beam intensity conversion lens 5 of example 1 provides the light intensity distribution in irradiation region 6 with a preferable flat-top form.

EXAMPLE 2

Example 2 is beam intensity conversion optical system 3 shown in FIG. 1 with a structure where irradiation region 6 is located anterior to paraxial image plane 7. Table 2 shows design data of beam intensity conversion lens 5 of example 2.

TABLE 2

| | | Example 2 |
|---|---|---|
| Apodization type | | Gaussian |
| Apodization factor | | 1 |
| Object-side NA | | 0.50 |
| Object distance | A | 1.600 |
| Lens thickness | B | 3.500 |
| Paraxial image plane position | C | 1.993 |
| Flat-top position | D | 0.800 |
| Lens surface parameter on object side | R | 4.160027554 |
| | C | −17.14195632 |
| | A4 | 0.002909489 |
| | A6 | 0.003391656 |
| | A8 | −0.001580417 |
| | A10 | 0.000383167 |
| Lens surface parameter on image side | R | −2.524975548 |
| | C | −0.609751555 |
| | A4 | 0.001085243 |
| | A6 | 0.000324837 |
| | A8 | 5.02637E−05 |
| | A10 | 6.63651E−06 |

Figure 5:
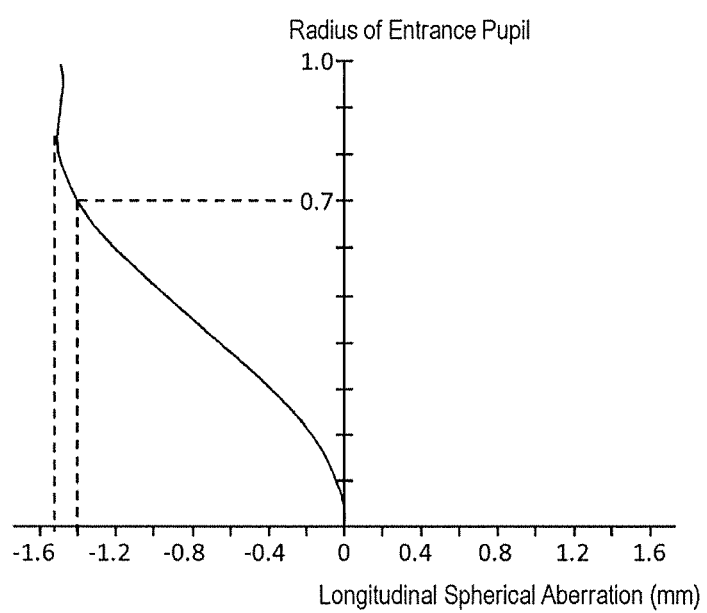
FIG. 5 shows a longitudinal spherical aberration characteristic of the beam intensity conversion lens of example 2 corresponding to the embodiment of the present disclosure.
Figure 6:
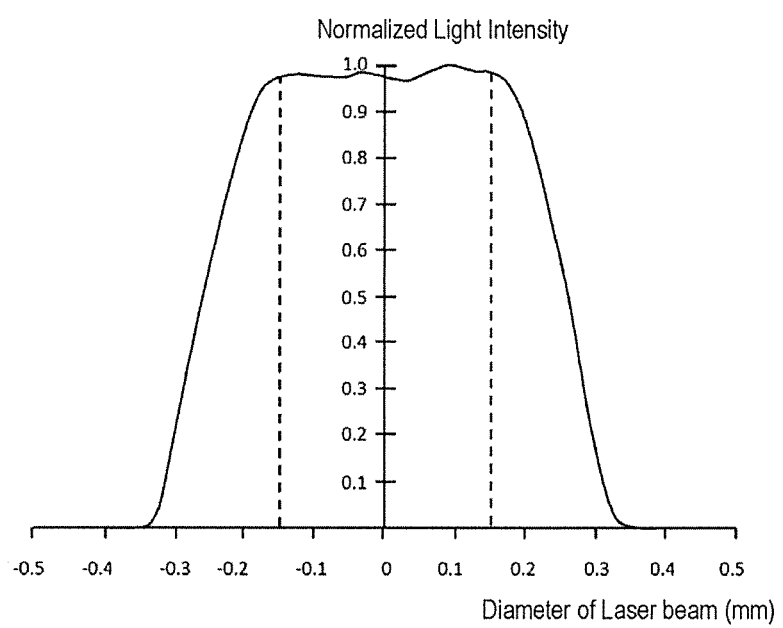
FIG. 6 shows a light intensity distribution in the irradiation region of the beam intensity conversion optical system of example 2 corresponding to the embodiment of the present disclosure.

FIG. 5 shows the longitudinal spherical aberration characteristic on paraxial image plane 7 of beam intensity conversion lens 5 of example 2. FIG. 6 shows the light intensity distribution in irradiation region 6 of beam intensity conversion optical system 3 of example 2. In FIG. 6, the vertical axis represents light intensity showing values normalized at a peak value of 1.0. The horizontal axis represents the diameter of laser light 1.

As shown in FIG. 5, the longitudinal spherical aberration of beam intensity conversion lens 5 gradually decreases in the range from optical axis 8 to the position of 70% of the image height. The amount of the longitudinal spherical aberration on paraxial image plane 7 at the position of 70% of the image height is −1.4 mm. The minimum value of the amount of the longitudinal spherical aberration on paraxial image plane 7 in a region of more than 70% of the image height is −1.51 mm, whereas the maximum value of the amount of the longitudinal spherical aberration on paraxial image plane 7 in a region of more than 70% of the image height is −1.4 mm. The changing range of the longitudinal spherical aberration in the region of more than 70% of the image height is thus 0.11 mm. That is, according to beam intensity conversion lens 5, the changing range of the longitudinal spherical aberration in the region of more than 70% of the image height is equal to or smaller than 20% of the amount of the longitudinal spherical aberration at the position of 70% of the image height.

According to the light intensity distribution characteristic of laser light 1 applied to irradiation region 6 from beam intensity conversion lens 5, as shown in FIG. 6, the light intensity distribution in a desired region has a minimum value of 0.960. That is, beam intensity conversion optical system 3 including beam intensity conversion lens 5 of example 2 provides the light intensity distribution in irradiation region 6 with a preferable flat-top form.

COMPARATIVE EXAMPLE 1

Comparative example 1 is beam intensity conversion optical system 3 shown in FIG. 1 with a structure where irradiation region 6 is located posterior to paraxial image plane 7. Table 3 shows design data of beam intensity conversion lens 5 of comparative example 1.

TABLE 3

| | | Comparative example 1 |
|---|---|---|
| Apodization type | | Gaussian |
| Apodization factor | | 1 |
| Object-side NA | | 0.60 |
| Object distance | A | 0.929 |
| Lens thickness | B | 2.500 |
| Paraxial image plane position | C | 1.993 |
| Flat-top position | D | 0.700 |
| Lens surface parameter on object side | R | 0.820060393 |
| | C | −4.239844675 |
| | A4 | 0.004504379 |
| | A6 | −0.005530549 |
| | A8 | 0.004623789 |
| | A10 | 0.004452704 |
| Lens surface parameter on image side | R | −0.928438122 |
| | C | −2.103832273 |
| | A4 | −0.041545292 |
| | A6 | 0.051733419 |
| | A8 | −0.033518584 |
| | A10 | 0.010462941 |

Figure 7:
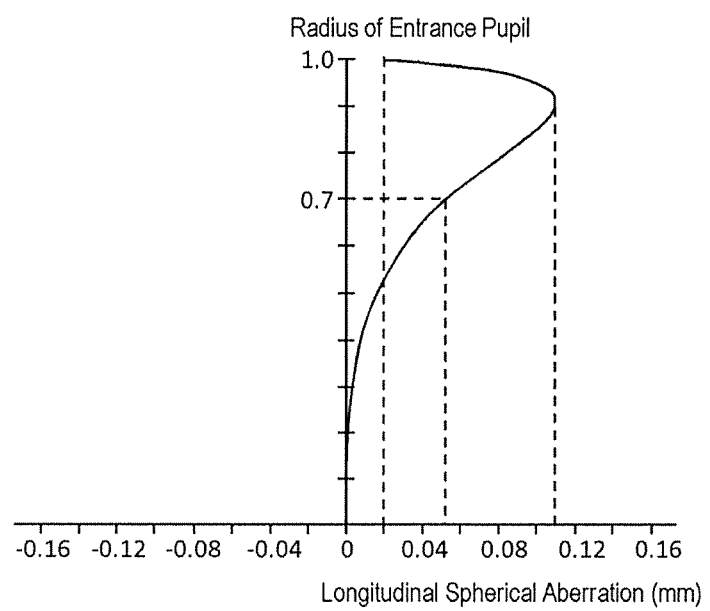
FIG. 7 shows a longitudinal spherical aberration characteristic of the beam intensity conversion lens of comparative example 1 in accordance with the embodiment of the present disclosure.
Figure 8:
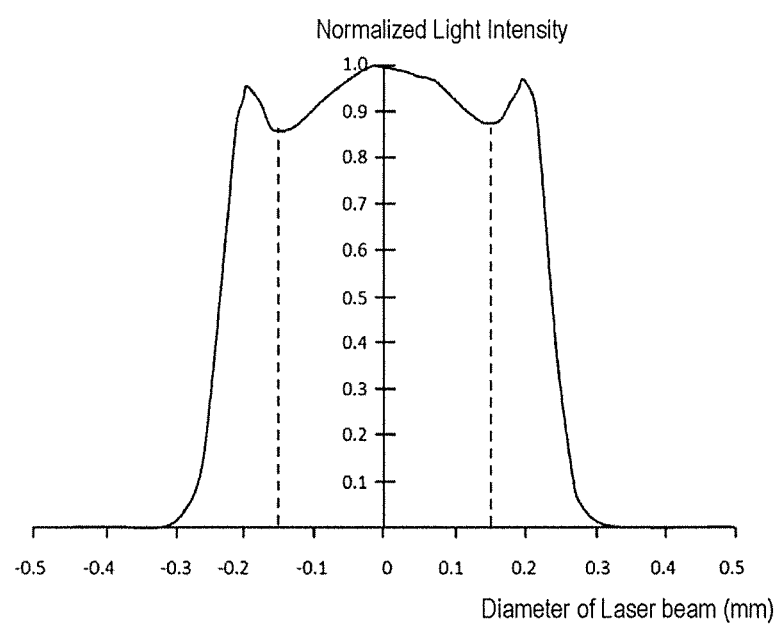
FIG. 8 shows a light intensity distribution in the irradiation region of the beam intensity conversion optical system of comparative example 1 in accordance with the embodiment of the present disclosure.

FIG. 7 shows the longitudinal spherical aberration characteristic on paraxial image plane 7 of beam intensity conversion lens 5 of comparative example 1. FIG. 8 shows the light intensity distribution in irradiation region 6 of beam intensity conversion optical system 3 of comparative example 1. In FIG. 8, the vertical axis represents light intensity showing values normalized at a peak value of 1.0. The horizontal axis represents the diameter of laser light 1.

As shown in FIG. 7, the longitudinal spherical aberration of beam intensity conversion lens 5 gradually increases in the range from optical axis 8 to the position of 70% of the image height. The amount of the longitudinal spherical aberration on paraxial image plane 7 at the position of 70% of the image height is +0.054 mm. The minimum value of the amount of the longitudinal spherical aberration on paraxial image plane 7 in a region of more than 70% of the image height is +0.02 mm, whereas the maximum value of the amount of the longitudinal spherical aberration on paraxial image plane 7 in the region of more than 70% of the image height is +0.11 mm. The changing range of the longitudinal spherical aberration in the region of more than 70% of the image height is thus 0.09 mm. That is, according to beam intensity conversion lens 5, the changing range of the longitudinal spherical aberration in the region of more than 70% of the image height is greater than 20% of the amount of the longitudinal spherical aberration at the position of 70% of the image height.

According to the light intensity distribution characteristic of laser light 1 applied to irradiation region 6 from beam intensity conversion lens 5, as shown in FIG. 8, the light intensity distribution in a desired region has a minimum value of 0.858. That is, beam intensity conversion optical system 3 including beam intensity conversion lens 5 of comparative example 1 fails to provide the light intensity distribution in irradiation region 6 with a preferable flat-top form.

COMPARATIVE EXAMPLE 2

Comparative example 2 is beam intensity conversion optical system 3 shown in FIG. 1 with a structure where irradiation region 6 is located posterior to paraxial image plane 7. Table 4 shows design data of beam intensity conversion lens 5 of comparative example 2.

TABLE 4

| | | Comparative example 2 |
|---|---|---|
| Apodization type | | Gaussian |
| Apodization factor | | 1 |
| Object-side NA | | 0.60 |
| Object distance | A | 0.929 |
| Lens thickness | B | 2.500 |
| Paraxial image plane position | C | 1.993 |
| Flat-top position | D | 0.700 |
| Lens surface parameter on object side | R | 0.82006 |
| | C | −4.239844675 |
| | A4 | −0.515229788 |
| | A6 | 1.307425203 |
| | A8 | −1.56038704 |
| | A10 | 0.663609817 |
| Lens surface parameter on image side | R | −0.928438 |
| | C | −2.103832273 |
| | A4 | −0.162276778 |
| | A6 | 0.16533451 |
| | A8 | −0.092006966 |
| | A10 | 0.017887613 |

Figure 9:
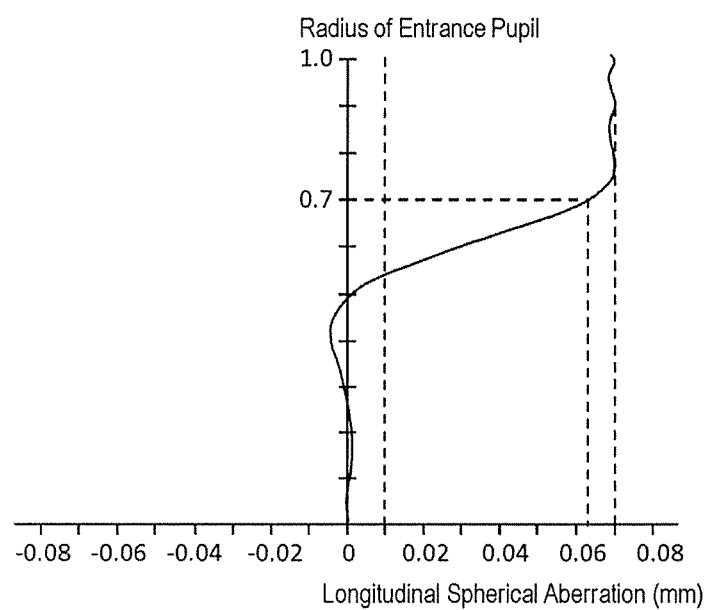
FIG. 9 shows a longitudinal spherical aberration characteristic of the beam intensity conversion lens of comparative example 2 in accordance with the embodiment of the present disclosure.
Figure 10:
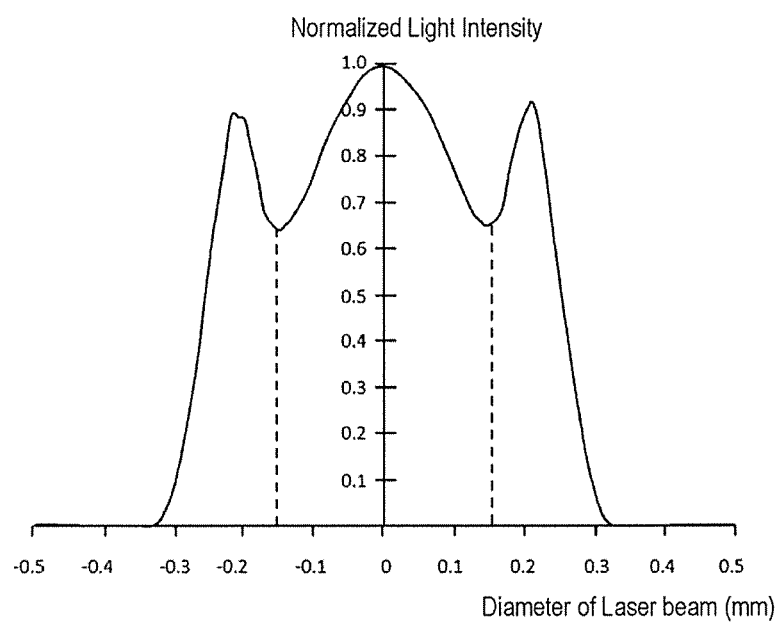
FIG. 10 shows a light intensity distribution in the irradiation region of the beam intensity conversion optical system of comparative example 2 in accordance with the embodiment of the present disclosure.

FIG. 9 shows the longitudinal spherical aberration characteristic on paraxial image plane 7 of beam intensity conversion lens 5 of comparative example 2. FIG. 10 shows the light intensity distribution in irradiation region 6 of beam intensity conversion optical system 3 of comparative example 2. In FIG. 10, the vertical axis represents light intensity, showing values normalized at a peak value of 1.0. The horizontal axis represents the diameter of laser light 1.

As shown in FIG. 9, the longitudinal spherical aberration of beam intensity conversion lens 5 does not gradually change in the range from optical axis 8 to the position of 70% of the image height. The longitudinal spherical aberration values have sign inversion at an entrance pupil radius R5 of 0.27 and 0.49. The amount of the longitudinal spherical aberration on paraxial image plane 7 at the position of 70% of the image height is +0.065 mm. The minimum value of the amount of the longitudinal spherical aberration on paraxial image plane 7 in a region of more than 70% of the image height is +0.065 mm, whereas the maximum value of the amount of the longitudinal spherical aberration on paraxial image plane 7 in a region of more than 70% of the image height is +0.071 mm. The changing range of the longitudinal spherical aberration in the region of more than 70% of the image height is thus 0.006 mm. That is, according to beam intensity conversion lens 5, the changing range of the longitudinal spherical aberration in the region of more than 70% of the image height is equal to or smaller than 20% of the amount of the longitudinal spherical aberration at the position of 70% of the image height.

However, according to the light intensity distribution characteristic of laser light 1 applied to irradiation region 6 from beam intensity conversion lens 5, as shown in FIG. 10, the light intensity distribution in a desired region has a minimum value of 0.645. That is, beam intensity conversion optical system 3 including beam intensity conversion lens 5 of comparative example 2 fails to provide the light intensity distribution in irradiation region 6 with a preferable flat-top form.

Although the beam intensity conversion optical system using a beam intensity conversion lens of two examples and two comparative examples has been described so far, but the present disclosure is not limited to the two examples of the embodiment. As long as not departing from the scope of the present disclosure, a structure in which various modifications as an idea of those skilled in the art is applied to the structure of the exemplary embodiment, or a structure formed as a combination of components described in the different embodiments may be included in the scope of one aspect or a plurality of aspects.

INDUSTRIAL APPLICABILITY

A beam intensity conversion optical system and a beam intensity conversion lens according to the present disclosure are useful for a laser excitation light source, for example.

REFERENCE MARKS IN THE DRAWINGS

1 laser light
3 beam intensity conversion optical system
4 laser light source
5 beam intensity conversion lens
6 irradiation region
7 paraxial image plane
8 optical axis

The invention claimed is:

1. A beam intensity conversion optical system comprising:
   a laser light source; and
   a beam intensity conversion lens that changes light intensity distribution of laser light emitted from the laser light source and applies the laser light to an irradiation region,
   wherein the beam intensity conversion lens has a single-lens structure,
   wherein a position of a paraxial image plane of the beam intensity conversion lens and a position of the irradiation region are different from each other on an optical axis of the laser light, and
   wherein the beam intensity conversion lens has a longitudinal spherical aberration characteristic, in which
   (1) an amount of the longitudinal spherical aberration of the beam intensity conversion lens gradually changes within a positional range from 0% of an entrance pupil radius of the beam intensity lens to 70% of the entrance pupil radius of the beam intensity conversion lens, the 0% of an entrance pupil radius indicating a position where the optical axis passes through the beam intensity conversion lens, and
   (2) a changing range of the longitudinal spherical aberration of the beam intensity conversion lens outside of the positional range is equal to or smaller than an amount of longitudinal spherical aberration of the beam intensity conversion lens at the 70% of the entrance pupil radius.

2. The beam intensity conversion optical system according to claim 1, wherein the amount of longitudinal spherical aberration of the beam intensity conversion lens gradually changes entirely within the positional range.

3. The beam intensity conversion optical system according to claim 1, wherein the amount of longitudinal spherical aberration of the beam intensity conversion lens gradually increases within the positional range.

4. The beam intensity conversion optical system according to claim 1, wherein the amount of longitudinal spherical aberration of the beam intensity conversion lens gradually decreases within the positional range.

5. A beam intensity conversion lens configure to irradiate an irradiation region with laser light emitted from a laser light source,
   wherein the beam intensity conversion lens has a longitudinal spherical aberration characteristic. in which
   (1) an amount of the longitudinal spherical aberration of the beam intensity conversion lens gradually changes within a positional range from 0% of an entrance pupil radius of the beam intensity lens to 70% of the entrance pupil radius of the beam intensity conversion lens, the 0% of an entrance pupil radius indicating a position where an optical axis of the laser light passes through the beam intensity conversion lens, and
   (2) a changing range of the longitudinal spherical aberration of the beam intensity conversion lens outside of the positional range is equal to or smaller than an amount of longitudinal spherical aberration of the beam intensity conversion lens at the 70% of the entrance pupil radius.

6. The beam intensity conversion lens according to claim 5, wherein the amount of longitudinal spherical aberration of the beam intensity conversion lens gradually changes entirely within the positional range.

7. The beam intensity conversion lens according to claim 5, wherein the amount of longitudinal spherical aberration of the beam intensity conversion lens gradually increases within the positional range.

8. The beam intensity conversion lens according to claim 5, wherein the amount of longitudinal spherical aberration of the beam intensity conversion lens gradually decreases within the positional range.

* * * * *